US009428400B2

(12) United States Patent
Isobe et al.

(10) Patent No.: US 9,428,400 B2
(45) Date of Patent: *Aug. 30, 2016

(54) PROCESSES FOR PRODUCING COLUMNAR TITANIUM DIOXIDE PARTICLES

(71) Applicant: ISHIHARA SANGYO KAISHA, LTD., Osaka (JP)

(72) Inventors: Kaoru Isobe, Yokkaichi (JP); Katsuichi Chiba, Yokkaichi (JP); Takanori Sakamoto, Yokkaichi (JP)

(73) Assignee: ISHIHARA SANGYO KAISHA, LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/552,102

(22) Filed: Nov. 24, 2014

(65) Prior Publication Data
US 2015/0104374 A1 Apr. 16, 2015

Related U.S. Application Data

(60) Continuation of application No. 13/487,370, filed on Jun. 4, 2012, now Pat. No. 8,926,713, which is a division of application No. 12/224,812, filed as application No. PCT/JP2007/054294 on Mar. 6, 2007, now Pat. No. 8,227,083.

(30) Foreign Application Priority Data

Mar. 7, 2006 (JP) .................................. 2006-061442

(51) Int. Cl.
*C01G 23/04* (2006.01)
*C30B 29/16* (2006.01)
(Continued)

(52) U.S. Cl.
CPC ............. *C01G 23/053* (2013.01); *C01G 23/00* (2013.01); *C01G 23/047* (2013.01);
(Continued)

(58) Field of Classification Search
CPC C01G 23/00; C01G 23/053; C01G 23/0536; C01G 23/0538; C01P 2004/12

USPC .................. 117/7, 75, 944; 423/69, 610
See application file for complete search history.

(56) References Cited

U.S. PATENT DOCUMENTS 2,480,869 A 9/1949 Mayer
3,579,310 A 5/1971 Lewis et al.
(Continued)

FOREIGN PATENT DOCUMENTS

EP 0341703 A2 11/1989
JP 47-44974 B 9/1970
(Continued)

OTHER PUBLICATIONS

Office Action in corresponding Korean Patent Application No. 10-2008-7021645 issued on Sep. 10, 2010.

*Primary Examiner* — Holly Le
(74) *Attorney, Agent, or Firm* — Paul E. White, Jr.; Manelli Selter PLLC

(57) ABSTRACT

Titanium dioxide and an electro-conductive titanium oxide which each includes particles having a large major-axis length in a large proportion and comprises columnar particles having a satisfactory particle size distribution. A titanium compound, an alkali metal compound, and an oxyphosphorus compound are heated/fired in the presence of titanium dioxide nucleus crystals having an aspect ratio of 2 or higher to grow the titanium dioxide nucleus crystals. Subsequently, a titanium compound, an alkali metal compound, and an oxyphosphorus compound are further added and heated/fired in the presence of the grown titanium dioxide nucleus crystals. Thus, titanium dioxide is produced which comprises columnar particles having a weight-average major-axis length of 7.0-15.0 μm and in which particles having a major-axis length of 10 μm or longer account for 15 wt. % or more of all the particles. A solution of a tin compound and a solution of compounds of antimony, phosphorus, etc. are added to a suspension obtained by suspending the titanium dioxide. The particles are sedimented. Subsequently, the product obtained is heated/fired to produce an electro-conductive titanium oxide which comprises the titanium dioxide and an electro-conductive coating formed on the surface thereof.

6 Claims, 3 Drawing Sheets

(51) Int. Cl.
*C01G 23/053* (2006.01)
*C01G 23/00* (2006.01)
*C01G 23/047* (2006.01)
*H01G 9/20* (2006.01)
*C04B 35/628* (2006.01)

(52) U.S. Cl.
CPC .... *C01G 23/0536* (2013.01); *C04B 35/62805* (2013.01); *C04B 35/62886* (2013.01); *H01G 9/2031* (2013.01); *C01P 2004/12* (2013.01); *C01P 2004/30* (2013.01); *C01P 2004/61* (2013.01); *C01P 2006/12* (2013.01); *C01P 2006/40* (2013.01); *C04B 2235/3232* (2013.01); *C04B 2235/3886* (2013.01); *C04B 2235/3895* (2013.01); *C04B 2235/5296* (2013.01); *C04B 2235/5409* (2013.01); *C04B 2235/5436* (2013.01); *Y02E 10/542* (2013.01); *Y02P 70/521* (2015.11); *Y10T 428/2982* (2015.01); *Y10T 428/2991* (2015.01)

(56) References Cited

U.S. PATENT DOCUMENTS

| | | |
|---|---|---|
| 3,728,443 A | 4/1973 | Berisford |
| 4,373,013 A | 2/1983 | Yoshizumi |
| 4,880,703 A | 11/1989 | Sakamoto et al. |
| 5,106,690 A | 4/1992 | Stramel |
| 5,320,782 A | 6/1994 | Okuda |
| 5,403,513 A | 4/1995 | Sato et al. |
| 6,231,981 B1 | 5/2001 | Hareyama |
| 6,703,438 B2 | 3/2004 | Hareyama |
| 7,407,606 B2 | 8/2008 | Chiba et al. |
| 7,514,124 B2 | 4/2009 | Onoyama et al. |
| 7,575,731 B2 | 8/2009 | Iijima et al. |
| 8,926,713 B2 * | 1/2015 | Isobe et al. ............ 23/301 |
| 2005/0070429 A1 | 3/2005 | Ruike |
| 2006/0105911 A1 | 5/2006 | Nakamura et al. |
| 2006/0208228 A1 | 9/2006 | Chiba et al. |
| 2009/0117383 A1 | 5/2009 | Isobe et al. |

FOREIGN PATENT DOCUMENTS

| | | |
|---|---|---|
| JP | 59-141425 A | 8/1984 |
| JP | 63-233016 A | 9/1988 |
| JP | 1-286924 A | 11/1989 |
| JP | 02-092824 A | 4/1990 |
| JP | 02-239119 A | 9/1990 |
| JP | 06-024977 | 4/1994 |
| JP | 06-227818 A | 8/1994 |
| JP | 08-217446 A | 8/1996 |
| JP | 11-292536 | 10/1999 |
| JP | 2000-219564 A | 8/2000 |
| JP | 2002-370027 | 12/2002 |
| WO | WO 2005/008685 | 1/2005 |

* cited by examiner

US 9,428,400 B2

PROCESSES FOR PRODUCING COLUMNAR TITANIUM DIOXIDE PARTICLES

This is a continuation application of U.S. patent application Ser. No. 13/487,370, now U.S. Pat. No. 8,926,713 filed Jun. 4, 2012, which is a divisional application of U.S. application Ser. No. 12/224,812 filed Sep. 5, 2008, (now U.S. Pat. No. 8,227,083) which is the National Stage entry from international application PCT/JP2007-054294 filed Mar. 6, 2007.

TECHNICAL FIELD

The present invention relates to titanium oxide in the shape of columnar particles, and a process for producing the same. It further relates to electro-conductive titanium oxide comprising the titanium oxide particles as a base, and a process for producing the same.

BACKGROUND ART

Titanium dioxide generally used as white pigments comprises usually particulate particles, and there are also known titanium dioxide particles having special particle shapes such as columnar and acicular shapes. These titanium dioxides which have a major-axis length larger than minor-axis length and an aspect ratio (major-axis length/minor-axis length), and are used, utilizing this anisotropic shape, as bases for electro-conductive materials, reinforcing materials, catalysts, catalyst carriers, special pigments, etc.

As processes for producing such titanium dioxides having anisotropic shape, there are known, for example, a process of mixing a usual rutile titanium dioxide with sodium chloride and an oxyphosphorus compound, and heating and firing the mixture to obtain acicular particles having a minor-axis length of 0.01-0.5 μm and an aspect ratio of 3-50 (Patent Document 1), a process of heating and firing a mixture comprising a titanium source, an alkali metal source and an oxyphosphorus compound in the presence of acicular titanium dioxide nucleus crystals to obtain acicular particles which have a weight-average minor-axis length of 0.05-0.8 μm and a weight-average major-axis length of 3-7 μm, and in which 70% by weight or more of the particles have a major-axis length of 2 μm or longer (Patent Document 2), etc.

Patent Document 1: JP-B-47-44974
Patent Document 2: JP-A-1-286924

DISCLOSURE OF INVENTION

Problem to be Solved by the Invention

Acicular particles can be obtained by the process disclosed in Patent Document 1, but they contain fine particles of small major-axis length in a large proportion, and hence the effect of acicular shape cannot be sufficiently exerted at the using site. On the other hand, according to the process disclosed in Patent document 2, particles having a relatively larger major-axis length can be easily obtained, and acicular particles less in particles of small major-axis length and having a satisfactory particle size distribution can easily be obtained. However, when in an attempt to produce particles having larger major-axis length, a large amount of a titanium compound is heated and fired at a time, alkali metal salt of titanic acid is produced to cause insufficient growth in the major-axis direction even if an alkali metal compound or oxyphosphorus compound are used in an amount corresponding to the amount of the titanium compound. Moreover, acicular particles smaller in major-axis length are produced in a separate phase of acicular titanium dioxide particles to result in expansion of the particle size distribution, and thus there is a limit in obtaining acicular particles having a larger major-axis length and a satisfactory particle size distribution.

Means for Solving the Problem

As a result of intensive research conducted by the inventors in an attempt to solve the above problems, it has been found that when addition, and heating and firing of acicular titanium dioxide nucleus crystals, titanium source, alkali metal source and oxyphosphorus compound are carried out dividedly twice or more times to cause uniform and stepwise growth of acicular nucleus crystals, acicular nucleus crystals grow preferentially in the direction of major-axis and the major-axis length of the acicular titanium dioxide particles becomes larger, and besides, production of fine particles precipitated without being used for growth is inhibited, and, thus, columnar particles which are more satisfactory in particle size distribution can be obtained.

Furthermore, it has been found that when reducing reaction or nitriding reaction is effected using the above titanium dioxide, low-order titanium oxide or titanium oxynitride having columnar shape is obtained; when an electro-conductive coating is provided on the surface of the resulting titanium dioxide particles, electro-conductive titanium oxide having columnar shape is obtained; and since they have larger major-axis length, the effect of anisotropy in shape can be more efficiently exerted. Thus, the present invention has been accomplished.

That is, the present invention has the following construction.

(1) Titanium dioxide which is in the shape of columnar particles and in which the particles have a weight-average major-axis length of 7.0-15.0 μm, and particles having a major-axis length of 10 μm or larger account for 15% by weight or more.

(2) Titanium oxide which is in the shape of columnar particles and in which the particles have a weight-average major-axis length of 7.0-15.0 μm and particles having a major-axis length of 10 μm or larger account for 15% by weight or more, the composition being represented by $TiO_x$ (in the formula, Ti denotes a titanium atom, O denotes an oxygen atom, and x can be a real number in the range of $1 \le x < 2$) or $TiN_yO_z$ (in the formula, Ti denotes a titanium atom, N denotes a nitrogen atom, O denotes an oxygen atom, and y denotes a ratio of nitrogen atom to titanium atom, z denotes a ratio of oxygen atom to titanium atom, and y and z each can be a real number in the range of more than 0 and less than 2).

(3) Electro-conductive titanium oxide which is in the shape of columnar particles and in which the particles have a weight-average major-axis length of 7.0-15.0 μm, particles having a major-axis length of 10 μm or larger account for 15% by weight or more, and the particles have an electro-conductive coating on the surface.

Moreover, the production process of the present invention has the following construction.

(4) A process for producing titanium dioxide which comprises heating and firing a titanium compound, an alkali metal compound and an oxyphosphorus compound in the presence of titanium dioxide nucleus crystals having an aspect ratio of 2 or higher and a weight-average major-axis length of 3.0-7.0 μm, thereby to produce titanium dioxide which is in the shape of columnar particles and in which the particles have a weight-average major-axis length of 7.0-15.0 µm, and particles having a major-axis length of 10 µm or larger account for 15% by weight or more.

(5) A process for producing titanium dioxide which comprises producing titanium dioxide in the shape of columnar particles through the first step of growing titanium dioxide nucleus crystals by heating and firing a titanium compound, an alkali metal compound and an oxyphosphorus compound in the presence of titanium dioxide nucleus crystals having an aspect ratio of 2 or higher, and the second step of further adding a titanium compound, an alkali metal compound and an oxyphosphorus compound and heating and firing them in the presence of the grown titanium dioxide nucleus crystals.

(6) A process for producing titanium dioxide which comprises growing titanium dioxide nucleus crystals by repeating twice or more times the step of heating and firing a titanium compound, an alkali metal compound and an oxyphosphorus compound in the presence of titanium dioxide nucleus crystals having an aspect ratio of 2 or higher.

(7) A process for producing titanium oxide which comprises heating and firing the titanium dioxide described in the above (1) in the presence of a reducing compound or a nitrogen-containing compound, thereby to produce titanium oxide in the shape of columnar particles which has a composition represented by $TiO_x$ (in the formula, Ti denotes a titanium atom, O denotes an oxygen atom, and x can be a real number in the range of $1 \leq x < 2$) or $TiN_yO_z$ (in the formula, Ti denotes a titanium atom, N denotes a nitrogen atom, O denotes an oxygen atom, and y denotes a ratio of nitrogen atom to titanium atom, z denotes a ratio of oxygen atom to titanium atom, and y and z each can be a real number in the range of more than 0 and less than 2).

(8) A process for producing an electro-conductive titanium oxide which comprises producing an electro-conductive titanium oxide in the shape of columnar particles by forming an electro-conductive coating on the surface of particles of the titanium dioxide described in the above (1).

ADVANTAGES OF THE INVENTION

The titanium dioxide, titanium oxide, electro-conductive titanium oxide, and process for producing the same have the following advantages.

(1) The titanium dioxide of the present invention is in the shape of columnar particles, contains particles of large major-axis length in a large proportion, and has satisfactory particle size distribution, and is further improved in effects when used for bases of electro-conductive material, reinforcing materials, catalysts, catalyst carriers, special pigments, etc., and can be used in various fields. Moreover, according to the production process of the present invention, titanium dioxide which is larger in major-axis length and is in the shape of columnar particles with a satisfactory particle size distribution can be relatively simply produced.

(2) The lower titanium dioxide and titanium oxynitride of the present invention contain particles of large major-axis length in a large proportion and are in the shape of columnar particles with a satisfactory particle size distribution, and the effects in using for conductivity imparting agents, reinforcing materials, catalysts, catalyst carriers, blackish pigments, etc. are further improved. Moreover, according to the production process of the present invention, low-order titanium oxide and titanium oxynitride which are larger in major-axis length and in the shape of columnar particles with a satisfactory particle size distribution can be relatively simply produced.

(3) The electro-conductive titanium oxide of the present invention contains particles of large major-axis length in a large proportion and is in the shape of columnar particles with a satisfactory particle size distribution, and the effects in using for conductivity imparting agents are further improved. Therefore, it is useful as electro-conductive materials to be incorporated in plastic resin compositions, e.g., electro-conductive coating compositions such as anti-static coating compositions, electro-conductive primers for electrostatic coating; anti-static sheets for automobile parts and electronic parts; planar heater with self control temperature. Moreover, according to the production process of the present invention, electro-conductive titanium oxide which is larger in major-axis length and is in the shape of columnar particles with a satisfactory particle size distribution can be relatively simply produced.

BEST MODE FOR CARRYING OUT THE INVENTION

The particles of titanium dioxide, low-order titanium oxide, titanium oxynitride and electro-conductive titanium oxide of the present invention have a major-axis length larger than the minor-axis length, and have an aspect ratio (major-axis length/minor-axis length) and have a columnar shape. The columnar shapes include those having an aspect ratio, such as rod, spindle, acicular and fibrous shapes in addition to the columnar shape. These shapes of particles can be confirmed by electron photomicrographs, and as for the size thereof, major-axis length and minor-axis length of at least 100 particles are measured, and weight-average major-axis length and weight-average minor-axis length are calculated by the following formulas, assuming the particles to correspond to a square pillar.

$$\text{Weight-average major-axis length} = \Sigma(Ln \cdot Ln \cdot Dn^2)/\Sigma(Ln \cdot Dn^2)$$

$$\text{Weight-average minor-axis length} = \Sigma(Dn \cdot Ln \cdot Dn^2)/\Sigma(Ln \cdot Dn^2)$$

In the above formulas, n represents number of each particle subjected to measurement, Ln represents major-axis length of n-th particle, and Dn represents minor-axis length of n-th particle.

Shape characteristics, composition and production process of the titanium dioxide, low-order titanium oxide, titanium oxynitride, and electro-electro-conductive titanium oxide of the present invention will be explained below.

(1) Titanium Dioxide and Process for Producing the Same.

The titanium dioxide of the present invention is in the shape of columnar particles, and the particles have a weight-average major-axis length of 5.0-15.0 µm, preferably 7.0-15.0 µm, more preferably 8.0-14.0 µm, most preferably 9.0-13.0 µm, and particles having a major-axis length of 10 µm or larger account for 15% by weight or more, preferably 25% by weight or more, more preferably 35% by weight or more of all the particles. On the other hand, it is preferred that the content of particles having small major-axis length is low, and content of particles having a major-axis length of smaller than 5.0 µm is preferably 40% by weight or less, more preferably 30% by weight or less, further preferably 20% by weight or less. Regarding the minor-axis length, the weight-average minor-axis length is preferably 0.25-1.0 µm, more preferably 0.3-0.8 µm.

Furthermore, in the present invention, the aspect ratio (weight-average major-axis length/weight-average minor-axis length) is preferably 3 or higher, more preferably 5-40, further preferably 10-40.

Moreover, the titanium dioxide of the present invention has a particle size distribution as mentioned above, and more preferable features of the titanium dioxide of the present invention from another viewpoint are that the particles have a columnar shape and contain those having a major-axis length of 10 μm or larger, preferably 10-30 μm, more preferably 10-20 μm in a proportion of 15% by weight or more, preferably 25% by weight or more, more preferably 35% by weight or more of all the particles. Due to the presence of these particles, the titanium dioxide can show excellent reinforcing properties and so on when added to resins.

The titanium dioxide may contain an alkali metal elements, phosphorus element, etc. in addition to $TiO_2$. The content of alkali metal elements is preferably 0.2% by weight or less, more preferably 0.1% by weight or less in terms of oxide. The content of phosphorus element is preferably 1% by weight or less, more preferably 0.5% by weight or less in terms of $P_2O_5$. The quality level of $TiO_2$ measured by X-ray diffraction method is preferably 90% by weight or more, more preferably 95% by weight or more, further preferably 99% by weight or more. The crystal form of the titanium dioxide of the present invention may be either of rutile type or anatase type, or may be amorphous, and rutile type crystals high in stability are preferred in the case of using it for bases of electro-electro-conductive materials, reinforcing materials, special pigments, etc. The specific surface area of titanium dioxide decreases when the major-axis length is further increased and particle size distribution is improved, and as indication from this viewpoint, the value of specific surface area is preferably about 1.0-3.5 $m^2/g$, more preferably about 1.5-3.0 $m^2/g$.

The titanium dioxide of the present invention can be produced in the following manners based on a process of heating and firing a titanium compound, an alkali metal compound and an oxyphosphorus compound in the presence of titanium dioxide nucleus crystals having an aspect ratio of 2 or higher.

(1-1) A titanium compound, an alkali metal compound and an oxyphosphorus compound are heated and fired in the presence of titanium dioxide nucleus crystals having an aspect ratio of 2 or higher and a weight-average major-axis length of 3.0-7.0 μm, preferably 4.0-6.0 μm, thereby producing titanium dioxide which is in the shape of columnar particles and in which the particles have a weight-average major-axis length of 7.0-15.0 μm, and particles having a major-axis length of 10 μm or larger account for 15% by weight or more of all the particles. This process is most suitable when the above titanium dioxide nucleus crystals of proper size are available, and acicular titanium dioxide such as of FTL series, specifically, FTL-300 manufactured by Ishihara Sangyo Kaisha, Ltd. can be used as the titanium dioxide nucleus crystals.

(1-2) Titanium dioxide in the shape of columnar particles is produced through the first step of growing titanium dioxide nucleus crystals by heating and firing a titanium compound, an alkali metal compound and an oxyphosphorus compound in the presence of titanium dioxide nucleus crystals having an aspect ratio of 2 or higher, and the second step of further adding a titanium compound, an alkali metal compound and an oxyphosphorus compound and heating and firing them in the presence of the grown titanium dioxide nucleus crystals. According to this process, the heating and firing in the presence of titanium dioxide nucleus crystals are repeated twice to result in growing to the desired size.

As embodiments of this process, it is preferred that at the first step, the titanium dioxide nucleus crystals are grown so that the ratio of weight-average major-axis length of the titanium dioxide nucleus crystals after growing to that of titanium dioxide nucleus crystals reaches 3-7, and at the next second step, the growing is carried out so that the ratio of weight-average major-axis length of the produced titanium dioxide to that of the titanium dioxide nucleus crystals reaches 2-5. Moreover, it is preferred that the weight-average major-axis length of the titanium dioxide nucleus crystals used at the first step is 1.0-4.0 μm, and the weight-average major-axis length of the titanium dioxide nucleus crystals used at the second step is 3.0-7.0 μm. Furthermore, it is preferred that the titanium dioxide nucleus crystals used at the first step is produced by heating and firing a titanium compound, an alkali metal compound and an oxyphosphorus compound. According to these embodiments, titanium dioxide having a larger major-axis length and a further well-regulated particle size distribution can be produced.

(1-3) The step of growing titanium dioxide nucleus crystals by heating and firing a titanium compound, an alkali metal compound and an oxyphosphorus compound in the presence of titanium dioxide nucleus crystals having an aspect ratio of 2 or higher is repeated twice or more times, preferably 2-5 times to grow titanium dioxide nucleus crystals, thereby producing titanium dioxide. This is a process of growing to the desired size by repeating twice or more times the heating and firing in the presence of titanium dioxide nucleus crystals.

As an embodiment of this process, it is preferred that the growing is carried out so that the ratio of weight-average major-axis length of the titanium dioxide nucleus crystals after growing to that of the titanium dioxide nucleus crystals used reaches 1.2-7, preferably 2-7 at the respective steps. According to the embodiment, titanium dioxide having a larger major-axis length and a further well-regulated particle size distribution can be produced.

The titanium dioxide nucleus crystals used in the present invention act as a seed for precipitation and growth of fresh titanium dioxide, and have a major-axis length larger than a minor-axis length and an aspect ratio (weight-average major-axis length/weight-average minor-axis length), which is preferably 2 or higher, more preferably 3 or higher, further preferably 5-40, most preferably 10-40. The particle shapes include those having an aspect ratio which are called acicular shape, rod-like shape, spindle shape, fibrous shape, columnar shape, and the like.

When heating and firing are carried out once (the process of the above 1-1), it is preferred to use titanium dioxide nucleus crystals having a weight-average major-axis length of preferably 3.0-7.0 μm, more preferably 4.0-6.0 μm. When heating and firing are carried out twice or more times (the processes of the above 1-2 and 1-3), it is preferred that the titanium dioxide nucleus crystals used at the first time have a weight-average major-axis length of preferably 1.0-4.0 μm, more preferably 2.0-4.0 μm. The titanium dioxide nucleus crystals used may have various crystal forms such as rutile type, anatase type, and the like, and can be optionally selected depending on the desired size of finally obtained titanium dioxide or purpose of use of the titanium dioxide, and may partially contain amorphous titanium oxide. For example, since it is preferred to use rutile type titanium dioxide high in stability for bases of electro-electro-conductive materials or reinforcing materials, it is preferred to use titanium dioxide nucleus crystals of rutile type because rutile type titanium dioxide can easily be obtained. It is further preferred that the content of rutile type crystals measured by X-ray diffraction method is at least 99%, more preferably at least 99.5%. Such titanium dioxide nucleus crystals can be obtained by the known process disclosed, for example, in JP-B-47-44974. The process disclosed in JP-B-47-44974 comprises mixing (a) rutile type titanium dioxide or titanium dioxide containing rutile type nucleus crystals, (b) sodium chloride or a mixture of a chloride and/or sulfate of alkali metal containing 50 mol % of sodium chloride and (c) an oxyphosphorus compound at a weight ratio of the components (b) and (a) of 1:0.05-1:2 and at a weight ratio of the components (b) and (c) of 5:1-130:1 calculated on the basis of phosphorus, heating and firing the mixture at a temperature of 725-1000° C. for 0.5-10 hours, and then removing soluble salts by washing, followed by subjecting to solid-liquid separation. The resulting titanium dioxide nucleus crystals may be optionally subjected to grinding and classification.

The titanium compounds used in the present invention include, for example, hydrous titanium oxides ($TiO_2.H_2O$, $TiO_2.2H_2O$), titanium hydroxide ($Ti(OH)_4$), titanium oxide ($TiO_2$), titanium sulfate ($(Ti(SO_4)_2)$), titanyl sulfate ($TiOSO_4$), titanium chloride ($TiCl_4$), titanium alcoxide ($Ti(OR)_4$: R is alkyl group), etc., and at least one compound selected from them can be used. Particularly, hydrous titanium oxide is preferred because it is high in reactivity and easy in handling. The hydrous titanium oxide, e.g., $TiO_2.H_2O$, is obtained by hydrolysis with heating of titanyl sulfate, neutralization hydrolysis of titanium chloride at high temperatures, etc., $TiO_2..2H_2O$ is obtained by neutralization hydrolysis of titanium sulfate or titanium chloride at low temperatures, and a mixture of them is obtained by optional control of neutralization hydrolysis temperature of titanium chloride. There are no particular limitations in crystal form and size of the titanium compounds such as hydrous titanium oxide, titanium hydroxide and titanium oxide, and the titanium oxide may be the same as the titanium dioxide nucleus crystals.

The alkali metal oxide is considered to have an action to accelerate formation of columnar shape of the titanium dioxide produced. The alkali metal compounds include, for example, chlorides, carbonates, hydroxides, etc. of sodium, potassium, lithium, etc., and at least one compound selected from them can be used. Among them, sodium chloride is preferred because it has high acceleration effect to form columnar shape.

The oxyphosphorus compounds are compounds containing phosphorus and oxygen, and have the effects to inhibit the production of titanic acid salts and regulate the shape of titanium dioxide particles, and are also considered to act to accelerate production of rutile type titanium dioxide. As the oxyphosphorus compounds, mention may be made of, for example, (1) phosphoric acids (orthophosphoric acid ($H_3PO_4$), pyrophosphoric acid ($H_4P_2O_7$), hypophosphoric acid ($H_4P_2O_6$), metaphosphoric acid ($(HPO_3)_n$), tripolyphosphoric acid ($H_5P_3O_{10}$), phosphorous acid ($H_3PO_3$), hypophosphorous acid ($H_3PO_2$), diphosphorous acid ($H_4P_2O_5$), peroxophosphoric acid ($H_4P_2O_8$), etc.), and salts thereof (primary phosphates ($MH_2PO_4$), secondary phosphates ($M_2HPO_4$), tertiary phosphates ($M_3PO_4$), pyrophosphates ($M_4P_2O_7$), dihydrogenpyrophosphates ($M_2H_2P_2O_7$), tripolyphosphates ($M_5P_3O_{10}$), metaphosphates ($(MPO_3)_n$), phosphites ($M_2HPO_3$), acid phosphites ($MH_2PO_3$), hypophosphites ($MH_2PO_2$), etc. where M is an alkali metal such as Na, K or the like), (2) ammonium phosphate (ammonium primary phosphate ($(NH_4)H_2PO_4$), ammonium secondary phosphate ($(NH_4)_2HPO_4$), ammonium tertiary phosphate ($(NH_4)_3PO_4$)) or salts thereof ($M(NH_4)HPO_4$: M is an alkali metal such as Na, K or the like), (3) phosphorus oxides ($P_2O_5$, $P_2O_3$, $PO_2$, $P_2O_4$, etc.), (4) halogenated oxyphosphorus compounds ($POCl_3$, $POBr_3$, etc.), (5) organic oxyphosphorus compounds (phosphoric acid esters ($PO(OR)_3$), acid phosphoric acid esters ($HOPO(OR)_2$, $(HO)_2PO(OR)$), etc. where R is alkyl group), and the like. One or more compounds selected from them can be used. Among them, sodium primary phosphate, sodium secondary phosphate, sodium pyrophosphate, and sodium tripolyphosphate are preferred because they have high effects, are powder at room temperature, and easy in handling.

Prior to heating and firing (the first step), the titanium dioxide nucleus crystals, titanium compound, alkali metal compound and oxyphosphorus compound are mixed. They may be dry mixed in the form of powder or wet mixed in the form of slurry. The amount of titanium dioxide nucleus crystals used is preferably 1-99% by weight of the total $TiO_2$ content in the mixture in terms of $TiO_2$, with the balance being titanium compound. When the amount of titanium dioxide nucleus crystals used is in the above range, small particles are hardly produced in a separate phase of the nucleus crystals, and it becomes easy to grow the nucleus crystals in the state of well-regulated particle size distribution. More preferred range is 3-60 parts by weight, and further preferred range is 5-40 parts by weight. The amount of alkali metal compound used is preferably 0.03-7 parts by weight based on 1 part by weight of the total $TiO_2$ content in the mixture in terms of alkali metal element. When the amount of the alkali metal compound is in the above range, the nucleus crystals can be easily grown in the direction of major-axis. More preferred range is 0.1-4 parts by weight. The amount of the oxyphosphorus compound used is preferably 0.005-1 part by weight based on 1 part by weight of the total $TiO_2$ content in the mixture in terms of phosphorus. When the amount of the oxyphosphorus compound is in the above range, the nucleus crystals can be easily grown in well-regulated shape. More preferred range is 0.01-0.6 part by weight. Successively, the mixture is heated and fired (the first step). The heating and firing temperature is preferably 700-1000° C. When the heating and firing temperature is in this range, the titanium compound can be easily converted to titanium dioxide, and grown nucleus crystals are hardly sintered with each other. The heating and firing temperature is more preferably 800-900° C. For heating and firing, there may be used known heating and firing furnaces such as fluidized bed furnace, standing furnace, rotary kiln, tunnel kiln, etc. It is preferred to grow the titanium dioxide nucleus crystals to the range of 0.05-0.8 μm in weight-average minor-axis length and the range of 3-7 μm in weight-average major-axis length because desired titanium dioxide can easily be obtained. If necessary, the grown titanium dioxide nucleus crystals may be introduced into water and suspended therein, and then boiled or heated to a temperature lower than the boiling point to dissolve the soluble salts, and thereafter may be filtered and washed to remove the soluble salts. Moreover, classification or dry grinding may be carried out according to the degree of sintering.

Then, prior to heating and firing (the second step), the titanium compound, alkali metal compound and oxyphosphorus compound are further added to the grown titanium dioxide nucleus crystals, and they are mixed. The addition and mixing of the titanium compound, alkali metal compound and oxyphosphorus compound may also be carried out by dry or wet process. The amount of the grown titanium oxide nucleus crystals used is preferably 1-99 part by weight of the total $TiO_2$ content in the mixture in terms of $TiO_2$, with the balance being titanium compound. When the amount of the grown titanium oxide nucleus crystals used is in the above range, desired particles which are less in particles of small major-axis length and have well-regulated particle size distribution can easily be obtained. More preferred range is 3-60 parts by weight, and further preferred range is 5-40 parts by weight. The amount of alkali metal compound used is preferably 0.03-7 parts by weight based on 1 part by weight of the titanium compound in terms of $TiO_2$. When the amount of the alkali metal compound is in the above range, particles of large major-axis length can easily be obtained. More preferred range is 0.1-4 parts by weight. The amount of oxyphosphorus compound used is preferably 0.005-1 part by weight in terms of phosphorus based on 1 part by weight of the titanium compound in terms of $TiO_2$. When the amount of the oxyphosphorus compound is in the above range, particles of regular shape can easily be obtained, and the amount is more preferably 0.01-0.6 part by weight. After the addition and mixing of the titanium compound, alkali metal compound and oxyphosphorus compound, the mixture is heated and fired (the second step) at preferably 700-1000° C. When the heating and firing temperature is in this range, the titanium compound can be easily converted to titanium dioxide, and, besides, the resulting grown particles are hardly sintered with each other, and particles which have more regular and more satisfactory particle size distribution can be obtained. The heating and firing temperature is more preferably 800-900° C. For heating and firing, there may be used known heating and firing furnaces such as fluidized bed furnace, standing furnace, rotary kiln, tunnel kiln, etc. as in the case of the first step. If necessary, the resulting titanium dioxide may be introduced into water and suspended therein, and then boiled or heated to a temperature lower than the boiling point to dissolve the soluble salts, and thereafter may be filtered and washed to remove the soluble salts. Moreover, classification or dry grinding may be carried out according to the degree of sintering.

As embodiments of this process, it is preferred that amounts of the titanium compound, alkali metal compound and oxyphosphorus compound are adjusted, and at the first step, the titanium dioxide nucleus crystals are grown so that the ratio of weight-average major-axis length of the titanium dioxide nucleus crystals after growing to that of the titanium dioxide nucleus crystals reaches 3-7, and at the next second step, the titanium dioxide nucleus crystals are grown so that the ratio of weight-average major-axis length of the produced titanium dioxide to that of the titanium dioxide nucleus crystals reaches 2-5. Moreover, it is preferred that the weight-average major-axis length of the titanium dioxide nucleus crystals used at the first step is 1.0-4.0 µm, and the weight-average major-axis length of the titanium dioxide nucleus crystals used at the second step is 3.0-7.0 µm. The particle size distribution is further improved by growing the titanium dioxide nucleus crystals in the above range or with use of particles having the above size. Furthermore, it is preferred to produce the titanium dioxide nucleus crystals used at the first step by heating and firing the titanium compound, alkali metal compound and oxyphosphorus compound.

In order to grow to further larger size the titanium dioxide obtained by carrying out heating and firing twice at the first step and the second step, the heating and firing can be repeated using the resulting titanium dioxide as nucleus crystals. That is, titanium dioxide can be produced by repeating twice or more times, preferably 2-5 times the step of growing the titanium dioxide nucleus crystals by heating and firing the titanium compound, alkali metal compound and oxyphosphorus compound in the presence of titanium dioxide nucleus crystals having an aspect ratio of 2 or higher to grow the titanium dioxide nucleus crystals. In this process, it is preferred that amounts of the titanium dioxide nucleus crystals, titanium compound, alkali metal compound and oxyphosphorus compound to be mixed are adjusted, and at each growing step, the titanium dioxide nucleus crystals are grown so that the ratio of weight-average major-axis length of the titanium dioxide nucleus crystals after growing to that of the titanium dioxide nucleus crystals used reaches preferably 1.2-7, more preferably 2-7. The particle size distribution can further be improved by growing the titanium dioxide nucleus crystals in the above range. As the titanium dioxide nucleus crystals, titanium compound, alkali metal compound and oxyphosphorus compound, there may be used those disclosed with reference to the first step and the second step, and the operation conditions such as temperature of heating and firing can also be the same as those disclosed with reference to the first step and the second step.

If necessary, the titanium dioxide produced in this way may be subjected to dry grinding or slurrying, wet grinding, dehydration, drying and dry grinding by known methods. There may be used apparatuses, for example, vertical sand mills and horizontal sand mills for wet grinding, band type heaters and batch type heaters for drying, impact grinders such as hammer mills and pin mills, attritors such as roller mills and parberizer, air current mills such as jet mills, spray dryers for dry grinding, and the like.

The titanium dioxide of the present invention can be used for bases of electro-electro-conductive materials, reinforcing materials, catalysts, catalyst carriers, special pigments, etc., and in the case of using it for bases of electro-electro-conductive materials, reinforcing materials and special pigments, the surface of particles may be coated with inorganic compound or organic compound or inorganic compound and organic compound in combination for the purpose of imparting dispersibility in resins in which the particles are incorporated or imparting weathering resistance to titanium dioxide per se. In the case of using inorganic compound and organic compound in combination, it is preferred to coat the outermost part of the particles with organic compound because the effect to improve dispersibility is particularly great. The inorganic compounds include, for example, oxides and hydrated oxide of silicon, zirconium, aluminum or titanium, and these may be used each alone or in combination of two or more as laminate or mixture. The organic compounds include, for example, (I) organosilicon compounds, (II) organometallic compounds, (III) polyols, (IV) alkanolamines or derivatives thereof, (V) higher fatty acids or metallic salts thereof, (VI) higher hydrocarbons or derivatives thereof, etc. The organic compounds may also be used each alone or in combination of two or more as laminates or mixtures.

More specific examples of the organic compounds usable are enumerated below.

As the organosilicon compounds (I), mention may be made of, for example, (1) organopolysiloxanes ((a) straight polysiloxanes (dimethyl polysiloxane, methyl hydrogen polysiloxane, methylmethoxy polysiloxane, methylphenyl polysiloxane, etc.), (b) modified polysiloxanes (dimethyl polysiloxane diol, dimethyl polysiloxane dihydrogen, side-chain or both-ends amino-modified polysiloxanes, side-chain or both-ends or one-end epoxy-modified polysiloxanes, both-ends or one-end methacryl-modified polysiloxanes, side-chain or both-ends carboxyl-modified polysiloxanes, side-chain or both-ends or one-end carbinol-modified polysiloxanes, both-ends phenol-modified polysiloxanes, side-chain or both-ends mercapto-modified polysiloxanes, both-ends or side-chain polyether-modified polysiloxanes, side-chain alkyl-modified polysiloxanes, side-chain methylstyryl-modified polysiloxanes, side-chain carboxylate-modified polysiloxanes, side-chain fluoroalkyl-modified polysiloxanes, side-chain alkyl.carbinol-modified polysiloxanes, side-chain amino.both-ends carbinol-modified polysiloxanes, etc.) or copolymers thereof, (2) organosilanes ((a) aminosilanes (aminopropyltriethoxysilane, N-β (aminoethyl)γ-aminopropyltriethoxysilane, N-phenyl-γ-aminopropyltrimethoxysilane, etc.), (b) epoxysilanes (γ-glycidoxypropyltrimethoxysilane, β-(3,4-epoxycyclohexyl)ethyltrimethoxysilane, etc.), (c) methacrylsilanes (methacryloxypropyltrimethoxysilane, etc.), (d) vinylsilanes (vinyltriethoxysilane, etc.), (e) mercaptosilanes (3-mercaptopropyltrimethoxysilane, etc.), (f) chloroalkylsilanes (3-chloropropyltriethoxysilane, etc.), (g) alkylsilanes (n-butyltriethoxysilane, isobutyltrimethoxysilane, n-hexyltrimethoxysilane, n-hexyltriethoxysilane, cyclohexylmethyldiethoxysilane, n-octyltrimethoxysilane, n-octyltriethoxysilane, n-decyltrimethoxysilane, n-hexadecyltriethoxysilane, n-octadecyltrimethoxysilane, n-octadecylmethyldimethoxysilane, etc.), (h) phenylsilanes(phenyltriethoxysilane, etc.), (i) fluoroalkylsilanes (trifluoropropyltrimethoxysilane, tridecafluorooctyltrimethoxysilane, etc.), etc., or hydrolyzates thereof, (3) organosilazanes (hexamethylsilazane, hexamethylcyclotrisilazane, etc.), and the like.

As the organometallic compounds (II), mention may be made of, for example, (1) organotitanium compounds ((a) aminoalkoxytitanium (isopropyltri(N-amino-ethyl) titanate, etc.), (b) titanium phosphate esters(isopropyltris(dioctyl pyrophosphate)titanate, bis(dioctyl pyrophosphate)oxyacetate titanate, bis(dioctyl pyrophosphate)ethylene titanate, etc.), (c) titanium carboxylate esters (isopropyltriisostearoyl titanate, etc.), (d) titanium sulfonate esters (isopropyl-n-dodecylbenzenesulfonyl titanate, etc.), (e) titanium chelates (titanium diisopropoxybisacetylacetonate, titanium diisopropoxybisethylacetoacetate, octyleneglucole titanate, etc.), etc., (f) titanium phosphorous ester complexes (tetraoctylbis (ditridecyl phosphite) titanate, tetra(2,2-diallyloxymethyl-1-butyl)bis(ditridecyl)phosphite titanate, tetraisopropylbis(dioctyl phosphite) titanate, etc.), (2) organozirconium compounds ((a) zirconium carboxylate esters (zirconium tributoxystearate, etc.), (b) zirconium chelates (zirconium tributoxyacetylacetonate, etc.), and the like), (3) organoaluminum compounds (aluminum chelates (aluminum acetylacetonatediisopropylate, aluminum ethylacetoacetatediisopropylate, aluminum bisethylacetoacetate monoacetylacetonate, octadeyleneacetoacetate aluminum diisopropylate, etc.), and the like.

The polyols (III) include, for example, trimethylolpropane, trimethylolethane, pentaerythritol, etc.

The alkanolamines (IV) include, for example, monoethanolamine, diethanolamine, triethanolamine, monopropanolamine, dipropanolamine, tripropanolamine, etc., and the derivatives thereof include, for example, organic acid salts thereof such as acetates, oxalates, tartrates, formates and benzoates.

The higher fatty acids (V) include, for example, stearic acid, lauric acid, oleic acid, etc., and the metallic salts thereof include, for example, aluminum salts, zinc salts, magnesium salts, calcium salts, barium salts, etc.

The higher hydrocarbons (VI) include, for example, paraffin wax, polyethylene wax, etc., and the derivatives thereof include, for example, perfluoro compounds thereof, etc.

The inorganic compounds or organic compounds can be coated on the surface of particles of titanium dioxide by known methods in dry grinding, suspending in solvent or in wet grinding of the titanium dioxide.

In the case of incorporating the titanium dioxide of the present invention in resin compositions such as coating compositions, inks or plastic molded products, e.g., films as reinforcing materials or white pigments, the resin compositions can be obtained utilizing the excellent reinforcing performance or masking performance. The resin compositions contain titanium dioxide in an optional amount, preferably 20% by weight or more, and may additionally contain composition forming materials used in the respective fields and furthermore various additives. In the case of coating compositions or inks, there are added coating film-forming materials or ink film-forming materials, solvents, dispersants, pigments, fillers, thickening agents, flow control agents, leveling agents, hardeners, crosslinking agents, catalyst for hardening, etc. As the coating film-forming materials, there may be used, for example, organic components such as acrylic resins, alkyd resins, urethane resins, polyester resins and amino resins, and inorganic components such as organo silicates and organo titanates, and as the ink film-forming materials, there may be used, for example, urethane resins, acrylic resins, polyamide resins, poly(vinyl chloride-acetate) resins, chlorinated propylene resins, etc. As these coating film-forming materials and ink film-forming materials, there may be used various resins such as thermosetting resins, cold-setting resins, ultraviolet-curing resins, etc., and there are no particular limitations, but when ultraviolet-curing resins of monomers or oligomers containing a photopolymerization initiator or a photosensitizer are used, and they are cured by irradiation with ultraviolet light after coating, a coating film excellent in hardness and adhesion can be obtained without applying heat load to the base, which is preferred.

In the case of plastics molded products, plastics, pigments, dyes, dispersants, lubricants, antioxidants, ultraviolet absorbers, light stabilizers, anti-static agents, flame-retardants, germicides, etc. are kneaded together with titanium dioxide of the present invention, and the resulting product is formed into an optional shape such as film. As the plastics, there may be used thermoplastic resins such as polyolefin resins, polystyrene resins, polyester resins, acrylic resins, polycarbonate resins, fluorine resins, polyamide resins, cellulose resins, and polylactic acid resins, and thermosetting resins such as phenolic resins and urethane resins.

(2) Low-Order Titanium Oxide and Titanium Oxynitride, and Process for Producing the Same The low-order titanium oxide and titanium oxynitride of the present invention have a shape of columnar particles, the particles have a weight-average major-axis length of 5.0-15.0 µm, preferably 7.0-15.0 µm, more preferably 8.0-14.0 µm, most preferably 9.0-13.0 µm, and the particles having a major-axis length of 10 µm or larger account for 15% by weight or more, preferably 25% by weight or more, more preferably 35% by weight or more of all the particles. On the other hand, it is preferred that the content of particles having small major-axis length is low, and the content of particles having a major-axis length of smaller than 5.0 µm is preferably 40% by weight or less, more preferably 30% by weight or less, further preferably 20% by weight or less.

Regarding the minor-axis length, the weight-average minor-axis length is preferably 0.25-1.0 µm, more preferably 0.3-0.8 µm.

Furthermore, in the present invention, the aspect ratio (weight-average major-axis length/weight-average minor-axis length) is preferably 3 or higher, more preferably 5-40, further preferably 10-40.

Moreover, the low-order titanium oxide and titanium oxynitride of the present invention have a particle size distribution of major-axis length as mentioned above, and more preferable features of the low-order titanium oxide and titanium oxynitride of the present invention from another viewpoint are that the particles have a columnar shape and contain those having a major-axis length of 10 µm or larger, preferably 10-30 µm, more preferably 10-20 µm in a proportion of 15% by weight or more, preferably 25% by weight or more, more preferably 35% by weight or more of all the particles. Due to the presence of these particles, the low-order titanium oxide and titanium oxynitride can exert excellent conductivity or the like when incorporated in resins.

The low-order titanium oxide and titanium oxynitride are produced by heating and firing the above-mentioned titanium dioxide in the presence of a reducing compound or a nitrogen-containing compound, and the composition of the low-order titanium oxide is represented by $TiO_x$ (in the formula, Ti denotes a titanium atom, O denotes an oxygen atom, and x can be a real number in the range of $1 \leq x < 2$), and the titanium oxynitride is represented by $TiN_yO_z$ (in the formula, Ti denotes a titanium atom, N denotes a nitrogen atom, O denotes an oxygen atom, and y denotes a ratio of nitrogen atom to titanium atom, z denotes a ratio of oxygen atom to titanium atom, and y and z each can be a real number in the range of more than 0 and less than 2). The low-order titanium oxide and titanium oxynitride may contain an alkali metal element, phosphorus element, etc. as impurities. The content of alkali metal element is preferably 0.2% by weight or less, more preferably 0.1% by weight or less in terms of oxide. The content of phosphorus element is preferably 1% by weight or less, more preferably 0.5% by weight or less in terms of $P_2O_5$.

The low-order titanium oxide and titanium oxynitride of the present invention can be produced by heating and firing the above-mentioned titanium dioxide in the shape of columnar particles in the presence of a reducing compound or a nitrogen-containing compound. Specifically, as the reducing compound, there may be used, for example, hydrogen, metallic titanium, sodium boron hydride, potassium boron hydride, etc., and as the nitrogen-containing compound, there may be used, for example, ammonia, alkylamines such as methylamine and dimethylamine, hydrazine compounds such as hydrazine, hydrazine sulfate and hydrazine hydrochloride, and these may be used each alone or in admixture of two or more. Among them, ammonia and alkylamines are preferred since they can be contacted in gaseous form with titanium dioxide, and uniform reaction can be easily performed. It is preferred to further add nitrogen, hydrogen or hydrocarbon in a slight amount to the nitrogen-containing compound because nitriding can be accelerated. Particularly, hydrocarbon is preferred because it reacts with oxygen in the titanium dioxide to form carbon dioxide, whereby production of water which inhibits nitriding reaction can be prevented. The titanium dioxide charged in an apparatus is heated and fired by raising the temperature of the apparatus to about 500-1200° C. in the presence of the reducing compound or nitrogen-containing compound. The heating and firing temperature is preferably about 600-1000° C., more preferably about 650-800° C. If the heating and firing temperature is lower than 500° C., reduction hardly proceeds and the low-order titanium oxide or titanium oxynitride can hardly be obtained. If the temperature is higher than 1200° C., sintering highly proceeds or the product gets out of shape due to change of crystal form during reduction. The heating and firing time is optionally set since it varies depending on the amount of titanium dioxide, reducing compound or nitrogen-containing compound, and is suitably about 1-20 hours, preferably about 3-10 hours for operation. Moreover, the titanium dioxide which has been heated and fired may be cooled and then further subjected to repetition of heating and firing. The heating and firing apparatuses may be known ones such as fluidized bed apparatus, rotary kiln and tunnel kiln, and rotary kiln is especially preferred. In this process, when silicon oxide is coated on the surface of titanium dioxide particles, followed by heating and firing, the particles are hardly sintered even at high temperatures in the above range, and furthermore rutile type titanium dioxide is hardly produced in the course of reaction, and thus nitriding readily proceeds, change of shape caused by change of crystal form hardly occurs. Therefore, low-order titanium oxide and titanium oxynitride having a large major-axis length and having satisfactory particle size distribution can be further readily obtained, which is preferred. The silicon oxide may be coated in the form of porous silicon oxide or dense silicon oxide, and the latter is preferred because the effect to inhibit sintering can be readily obtained. The coating amount of the silicon oxide can be optionally set, and is suitably about 0.01-30% by weight based on titanium dioxide.

If necessary, the low-order titanium oxide and titanium oxynitride produced may be subjected to dry grinding or slurrying, followed by wet grinding of the slurry, dehydrating, drying and dry grinding by known methods. Furthermore, an inorganic compound or an organic compound, or an inorganic compound and an organic compound in combination can be coated on the surface of particles of the low-order titanium oxide or titanium oxynitride in the same manner as coating on titanium dioxide. The inorganic compound or organic compound can be coated on the surface of particles of low-order titanium oxide or titanium oxynitride by known methods during dry grinding, suspending in solvent or wet grinding.

When the low-order titanium oxide or titanium oxynitride of the present invention is incorporated in resin compositions such as coating compositions, inks or plastic molded products, e.g., films, as a black pigment or a conductivity imparting agent, the resin compositions which utilize the excellent masking performance (light screening performance), blacking performance or conducting performance can be obtained. To the resin compositions, the low-order titanium oxide or titanium oxynitride is added in an optional amount, preferably 20% by weight or more, and there may be further added a composition forming material used in various fields and various additives. In the case of using for coating compositions or inks, there are added coating film-forming materials or ink film-forming materials, solvents, dispersants, pigments, fillers, thickening agents, flow control agents, leveling agents, hardeners, crosslinking agents, catalysts for hardening, etc. As the coating film-forming materials, there may be used, for example, organic components such as acrylic resins, alkyd resins, urethane resins, polyester resins and amino resins, and inorganic components such as organosilicates and organotitanates, and as the ink film-forming materials, there may be used, for example, urethane resins, acrylic resins, polyamide resins, poly(vinyl chloride-acetate) resins, chlorinated propylene resins, etc. As these coating film-forming materials and ink film-forming materials, there may be used various resins such as thermosetting resins, cold-setting resins, ultraviolet-curing resins, etc., and there are no particular limitations, but when ultraviolet-curing resins of monomers or oligomers containing a photopolymerization initiator or a photosensitizer are used, and they are cured by irradiation with ultraviolet light after coating, a coating film excellent in hardness and adhesion can be obtained without applying heat load to the base, which is preferred.

In the case of plastics molded products, plastics, pigments, dyes, dispersants, lubricants, antioxidants, ultraviolet absorbers, light stabilizers, anti-static agents, flame-retardants, germicides, etc. are kneaded together with the low-order titanium oxide or titanium oxynitride of the present invention, and the resulting product is formed into an optional shape such as film. As the plastics, there may be used thermoplastic resins such as polyolefin resins, polystyrene resins, polyester resins, acrylic resins, polycarbonate resins, fluorine resins, polyamide resins, cellulose resins, and polylactic acid resins, and thermosetting resins such as phenolic resins and urethane resins.

(3) Electro-Electro-Conductive Titanium Oxide and Process for Producing the Same The electro-electro-conductive titanium oxide of the present invention is in the shape of columnar particles, where the particles have a weight-average major-axis length of 5.0-15.0 μm, preferably 7.0-15.0 μm, more preferably 8.0-14.0 μm, further preferably 9.0-13.0 μm, and the particles having a major-axis length of 10 μm or larger account for 15% by weight or more, preferably 25% by weight or more, more preferably 35% by weight or more of all the particles. On the other hand, it is preferred that the content of particles having small major-axis length is low, and the content of particles having a major-axis length of smaller than 5.0 μm is preferably 40% by weight or less, more preferably 30% by weight or less, further preferably 20% by weight or less. Regarding the minor-axis length, the weight-average minor-axis length is preferably 0.25-1.0 μm, more preferably 0.3-0.8 μm.

Furthermore, in the present invention, the aspect ratio (weight-average major-axis length/weight-average minor-axis length) is preferably 3 or higher, more preferably 5-40, further preferably 10-40. The electro-electro-conductive titanium oxide comprises the above titanium dioxide used as a base of electro-electro-conductive materials, and has a electro-electro-conductive coating on the surface of the particles, and the conductivity is given by the coating film.

Moreover, the electro-electro-conductive titanium oxide of the present invention has a particle size distribution of major-axis length as mentioned above, and more preferable features of the electro-conductive titanium oxide of the present invention from another viewpoint are that the particles have a columnar shape and contain those having a major-axis length of 10 μm or larger, preferably 10-30 μm, more preferably 10-20 μm in a proportion of 15% by weight or more, preferably 25% by weight or more, more preferably 35% by weight or more of all the particles. Due to the presence of these particles, the electro-conductive titanium oxide can exert excellent conductivity or the like when incorporated in resins.

Various known materials can be used as the electro-conductive coating, and, if there is contained tin oxide in which at least one element selected from antimony, phosphorus, tungsten, fluorine, niobium and tantalum is dissolved in solid state or tin oxide in which the above element is not dissolved in solid state, metallic material, electro-conductive polymer or electro-conductive carbon, excellent effects are exerted, which is preferred. The tin oxide in which at least one element selected from antimony, phosphorus, tungsten, fluorine, niobium and tantalum is dissolved in solid state gives white color and is preferred. Tin oxide in which antimony is dissolved in solid state is further preferred because excellent conductivity can be obtained, and tin oxide in which phosphorus is dissolved in solid state is also further preferred because it is high in safety and relatively superior in conductivity.

The electro-conductive titanium oxide of the present invention can be produced by forming an electro-conductive coating on the surface of particles of the above titanium dioxide having columnar particle shape. Conventionally known technologies can be used for forming the electro-conductive coating, and specifically, there are a method which comprises adding a solution containing a tin compound to a suspension of titanium dioxide or adding a solution containing a tin compound and a solution containing a compound of at least one element selected from antimony, phosphorus, tungsten, fluorine, niobium and tantalum to a suspension of titanium dioxide, to result in precipitation, and then heating and firing the resulting product to form an electro-conductive coating containing a tin oxide in which at least one element selected from antimony, phosphorus, tungsten, fluorine, niobium and tantalum is dissolved in solid state or a tin oxide in which the above element is not dissolved in solid state, a method which comprises adding a metallic compound of copper, silver, gold, nickel, platinum, cobalt or the like and a reducing compound to a suspension in which titanium dioxide is suspended to reduce the metallic compound, thereby forming an electro-conductive coating containing a metallic material, a method which comprises synthesizing an electro-conductive polymer such as polyacetylene, polypyrrole, polythiophene or polyaniline or an electro-conductive carbon in the presence of titanium dioxide to form an electro-conductive film containing electro-conductive polymer or electro-conductive carbon, and other methods.

It is preferred that before forming the electro-conductive coating, the titanium dioxide in the shape of columnar particles is previously leached with an acid or an alkali to remove impurities, particularly, the alkali metal compound and oxyphosphorus compound used in preparation of the titanium dioxide, to cause improvement of conductivity. The content of the alkali metal compound is decreased to preferably 0.2% by weight or less, more preferably 0.1% by weight or less in terms of oxide. The content of the oxt-phosphorus compound is decreased to preferably 1% by weight or less, more preferably 0.5% by weight or less in terms of $P_2O_5$. The acid used for leaching is preferably an inorganic acid such as hydrochloric acid, sulfuric acid, nitric acid or hydrofluoric acid, and the alkali is preferably sodium hydroxide or potassium hydroxide. Particularly, when tin oxide in which phosphorus is dissolved in solid state mentioned hereinafter is used as the electro-conductive coating, and when the content of metal element having a valence of 4 or less as impurities contained in titanium dioxide is 0.02 or less expressed by value (A) obtained from the following formula (I), more excellent conductivity is easily obtained, which is preferred.

$$(A) = (M'_1) \times (4-n'_1) + (M'_2) \times (4-n'_2) + (M'_3) \times (4-n'_3) + (M'_4) \times (4-n'_4) + \cdots + (M'_y) \times (4-n'_y) \quad \text{Formula (1)}$$

[in which $M'_1$, $M'_2$, $M'_3$, $M'_4$, --- $M'_Y$ are respective atomic ratios of metal elements having a valence of 4 or less to Ti of titanium dioxide, $n'_1$, $n'_2$, $n'_3$, $n'_4$, - - - $n'_Y$ denote respective valences of metal elements having atomic ratios of $M'_1$, $M'_2$, $M'_3$, $M'_4$, - - - $M'_Y$, and Y of $M'_Y$ and $n'_Y$ denotes the number of the metal element contained in titanium dioxide and can be a natural number of 1 or more].

In forming the electro-conductive coating, first, a suspension is prepared by suspending titanium dioxide in a solvent such as water. In preparing a slurry, the titanium dioxide may be suitably dispersed using a wet grinder such as vertical sand mill, horizontal sand mill or ball mill depending on the degree of agglomeration of titanium dioxide. The concentration of the suspension is not particularly limited and is optionally set depending on productive facilities and production capacity, and industrially is preferably 25-600 g/l, more preferably 50-400 g/l. The pH of the suspension is adjusted preferably to acidic area or alkaline area because titanium dioxide particles are stably dispersed, more preferably adjusted to the alkaline area because corrosion of facilities hardly occurs, and it is further preferred to adjust pH to 10-11. If necessary, dispersants may be used, and examples of the dispersants are phosphoric acid compounds such as sodium phosphate, sodium pyrophosphate, sodium orthophosphate, sodium metaphosphate and sodium tripolyphosphate, nitrogen-containing compounds such as monoethanolamine, water-soluble silicon compounds such as sodium silicate, and the like. The amount of the dispersants used can be optionally set, and the phosphoric acid compound is preferably 0.01-3% by weight based on titanium dioxide.

Known methods can be used for forming an electro-conductive coating on the surface of titanium dioxide particles. Specifically, for the formation of coating film of tin oxide in which antimony is dissolved in solid state, the method disclosed, for example, in JP-A-63-233016 (U.S. Pat. No. 4,880,703) can be used. The method disclosed in JP-A-63-233016 comprises adding a tin chloride solution and an antimony chloride solution to a suspension of titanium dioxide, hydrolyzing tin chloride and antimony chloride to form a coating layer of tin oxide hydrate and antimony oxide hydrate, followed by subjecting to solid-liquid separation, and carrying out heating and firing. In this method, hydrolysis of tin chloride and antimony chloride is carried out with keeping the pH of the suspension in a range of 2-6 while adding an alkali, but the hydrolysis may be carried out in the pH range of the suspension of 8-12. The amount of tin oxide hydrate contained in the coating layer is preferably 0.005-0.25 g, more preferably 0.025-0.15 g in terms of $SnO_2$ per 1 $m^2$ of the surface area of titanium dioxide particles. The amount of antimony oxide hydrate is preferably 0.008-0.40, more preferably 0.04-0.32 in atomic ratio of Sb/Sn based on tin oxide hydrate. Known heating and firing furnaces such as fluidized bed furnace, standing furnace, rotary kiln and tunnel kiln can be used for heating and firing, and the heating and firing are carried out at preferably 400-800° C., more preferably 500-700° C. The atmosphere for firing is any of oxidizing atmosphere, reducing atmosphere and inert atmosphere, and the firing may be carried out in the air. The coating amount of tin oxide must be changed depending on the specific surface area of titanium dioxide as mentioned above, and the coating amount of tin oxide expressed by % by weight is preferably 1-50% by weight, more preferably 5-30% by weight as $SnO_2$ with respect to titanium dioxide. The content of antimony is preferably about 1-30% by weight, more preferably about 5-25% by weight as $Sb_2O_5$ with respect to tin oxide ($SnO_2$).

For the formation of coating film of tin oxide in which phosphorus is dissolved in solid state, the method disclosed, for example, in WO2005/008685 pamphlet can be used. The method disclosed in WO2005/008685 pamphlet comprises adding a solution of a tin compound such as tin chloride and a solution of a phosphorus compound such as phosphoric acid to a suspension of titanium dioxide to co-precipitate the tin compound and the phosphorus compound to form a coating layer of tin oxide hydrate and phosphorus on the surface of particles, followed by subjecting to solid-liquid separation, and carrying out heating and firing. In this method, the co-precipitation of the tin compound and the phosphorus compound can be carried out by neutralization with an alkali in a pH range of preferably 2-6 or 8-12. The amount of tin oxide hydrate contained in the coating layer is preferably 0.015-0.3 g, more preferably 0.03-0.3 g, further preferably 0.05-0.2 g in terms of $SnO_2$ per 1 $m^2$ of the surface area of columnar titanium oxide particles. The amount of phosphorus is preferably 0.10-0.50, more preferably 0.13-0.40 in atomic ratio of P/Sn with respect to tin oxide hydrate. Known heating and firing furnaces such as fluidized bed furnace, standing furnace, rotary kiln and tunnel kiln can be used for heating and firing, and the heating and firing are carried out at preferably 600-950° C., more preferably 800-900° C. The atmosphere for firing is any of oxidizing atmosphere, reducing atmosphere and inert atmosphere, but care must be taken on the atmosphere in cooling after firing. That is, in the case of rapid cooling, there may be used any of oxidizing atmosphere, reducing atmosphere and inert atmosphere, and it is not necessary to control oxygen concentration, but in the case of slow cooling, it is preferred to carry out the cooling at low oxygen concentration in reducing atmosphere or inert atmosphere. The coating amount of tin oxide is preferably about 1-50% by weight, more preferably about 5-30% by weight as $SnO_2$ with respect to titanium dioxide. The content of phosphorus is preferably about 0.10-0.50, more preferably about 0.13-0.40 in atomic ratio of P/Sn with respect to tin oxide.

Known compounds can be used as alkali and acid for adjustment of pH, neutralization, or the like. Examples of the compounds are inorganic acids such as sulfuric acid, hydrochloric acid and hydrofluoric acid, organic acids such as acetic acid and formic acid, hydroxides of alkali metals or alkaline earth metals such as sodium hydroxide, potassium hydroxide and calcium hydroxide, carbonates of alkali metals or alkaline earth metals such as sodium carbonate and potassium carbonate, ammonium compounds such as ammonia, ammonium carbonate and ammonium nitrate, and the like.

An electro-conductive coating can also be formed using the tin oxide in which at least one element selected from tungsten, fluorine, niobium and tantalum is dissolved in solid state or tin oxide in which no such element is dissolved in solid state by the same method as of forming the coating film using the tin oxide in which antimony or phosphorus is dissolved in solid state. Furthermore, an electro-conductive coating of metallic material such as nickel, copper, silver, gold, platinum or cobalt can be formed by known method of electroless plating or electrolytic plating. That is, the electro-conductive coating can be formed by a method which comprises adding to a suspension of titanium dioxide a metallic compound of nickel, copper, silver, gold, platinum or cobalt and a reducing compound such as hydrazine, sodium boron hydride, formaldehyde, tartaric acid, glucose, sodium hypophosphite or N—N-diethylglycine sodium, if necessary, in the presence of buffer, pH adjustor, accelerator, stabilizer, complexing agent such as sodium citrate, sodium acetate or ethylene glycol, thereby to reduce the metallic compound. Furthermore, an electro-conductive coating of an electro-conductive polymer such as polyacetylene, polypyrrole, polythiophene or polyaniline or an electro-conductive carbon can be formed by synthesizing the electro-conductive polymer or electro-conductive carbon in the presence of titanium dioxide by known methods.

After the electro-conductive titanium oxide is produced in this way, for example, for the purpose of improving dispersibility, an inorganic compound, an organic compound or an inorganic compound and an inorganic compound in combination may be further coated on the surface of the electro-conductive coating in such an amount as not damaging the conductivity. In the case of using inorganic compound and organic compound in combination, if the organic compound is coated on the outermost part, excellent dispersibility is apt to be obtained, which is preferred. Examples of the inorganic compound are oxides and hydrated oxides of silicon, zirconium, aluminum and titanium, and these may be used each alone or as laminate or admixture of two or more. The organic compounds include, for example, organosilicon compounds (mentioned hereinbefore), organometallic compounds (mentioned hereinbefore), polyols (mentioned hereinbefore), alkanolamines or derivatives thereof (mentioned hereinbefore), higher fatty acids or metallic salts thereof (mentioned hereinbefore), higher hydrocarbons or derivatives thereof (mentioned hereinbefore), etc. The organic compounds may also be used each alone or in combination of two or more as laminates or admixtures. The inorganic compound or organic compound can be coated on the surface of electro-conductive titanium oxide particles by known methods during dry grinding, suspending in solvent or wet grinding. Furthermore, dry grinding can be optionally conducted depending on the degree of sintering of the electro-conductive titanium oxide, and there may be used apparatuses, for example, impact grinders such as hammer mills and pin mills, attritors such as roller mills and parberizer, air current mills such as jet mills and snail mills, spray dryers, etc.

Since the electro-conductive titanium oxide of the present invention contains particles having a large major-axis length in a high proportion, the particles per se easily contact with each other in the electro-conductive composition and flowing route of electricity can be readily assured. Therefore, excellent conductivity can be obtained with a small amount of the titanium oxide, and the electro-conductive titanium oxide can be used as electro-conductive materials to be incorporated in plastic resin compositions, e.g., electro-conductive coating agents such as anti-static coating compositions and electro-conductive primers for electrostatic coating; anti-static sheets for automobile parts and electronic parts; self temperature controlling area heating media, etc. For example, in the case of carrying out electrostatic coating on plastics, recently, for rationalization of steps, so-called wet-on-wet coating is mainly employed which comprises carrying out electro-conductive primer coating or surface coating, and thereafter baking to harden the coating film. Therefore, the electro-conductive primer used for wet-on-wet coating is required to have conductivity in the state of containing volatile matters before hardening. If the electro-conductive titanium dioxide is incorporated so as to obtain such a concentration as giving desired conductivity to the coating film before hardening, the coating film after hardening has too high concentration, and, hence, properties of the coating film are damaged, for example, adhesion and smoothness of the coating film are deteriorated. However, since the columnar electro-conductive titanium dioxide of the present invention has excellent conductivity, wet-on-wet coating can be applied even if the concentration is decreased, and thus it is suitable for electrodeposition coating compositions for primer. On the other hand, the self temperature controlling area heating media are used for carpet heaters, roof heaters, etc. The self control temperature mechanism of the planar heater with self control temperature is that in the state of normal temperature, the electro-conductive materials are in the state of contacting with each other in the resin matrix, and heat is generated when electricity flows through the electro-conductive materials. When the resin matrix is expanded upon generation of heat, the electro-conductive materials become difficult to contact with each other, and flowing of electricity stops, resulting in decrease of temperature. When the resin matrix shrinks upon decrease of temperature, the electro-conductive materials again contact with each other, resulting in flowing of electricity. In case the columnar electro-conductive titanium dioxide is used for the planar heater with self control temperature, contacting and non-contacting of the columnar particles are efficiently attained due to the length of major-axis, and accurate self control temperature and long-term stability can be imparted.

In the case of using the electro-conductive titanium oxide for electro-conductive coating composition and anti-static coating composition, usually a binder resin and a solvent are used together with the electro-conductive titanium oxide. Examples of the binder resins are alkyd resins, acrylic resins, polyester resins, epoxy resins, amino resins, fluorine resins, modified silicone resins, urethane resins, vinyl resins, chlorinated polyolefins, etc. Examples of the solvents are organic solvents such as alcohols, esters, ethers, ketones, aromatic hydrocarbons and aliphatic hydrocarbons, water, and mixed solvents thereof, and are selected depending on compatibility with binder resins. The coating compositions may be dissolution type, emulsion type, colloidal dispersion type, etc., and are not particularly limited, and hardening methods may be heat hardening, cold hardening, ultraviolet hardening, electron radiation hardening, etc., and are not particularly limited. Depending on the purpose, there may be further contained various additives, e.g., colorants such as organic pigments, inorganic pigments and dyes, extenders, surface active agents, plasticizers, hardening assistants, dryers, antifoamers, thickening agents, emulsifiers, flow controlling agents, anti-skinning agents, anti-segregating agents, ultraviolet absorbers, mildew-proofing agents, fillers, etc. Alternatively, the coating composition may be a two-pack coating composition in which a hardening solution of hardening agent, hardening assistant and hardening resin component is separately added at the time of coating. In case the electro-conductive titanium oxide is used for electro-conductive plastics composition, the electro-conductive titanium oxide is incorporated in a plastics resin, e.g., a thermosetting resin such as polyolefin resin, vinyl chloride resin, vinyl acetate resin, polystyrene resin, ABS resin, PET resin, polyester resin, aromatic resin, nylon resin, polycarbonate resin, polyacetal resin, cellulose resin or polylactic acid resin, or a thermoplastic resin such as alkyd resin, acrylic resin, phenolic resin, urethane resin, unsaturated polyester resin or silicone resin. In addition to the electro-conductive titanium oxide and the plastics resin, according to the purpose, there may be contained various additives, e.g., colorants such as organic pigments, inorganic pigments and dyes, extenders, surface active agents, plasticizers, lubricants.stabilizers, anti-static agents, antioxidants, ultraviolet absorbers, light stabilizers, flame retardants, brightening agents, germicides, and reinforcing agents, fillers, and the like. The amount of the electro-conductive titanium oxide incorporated is preferably 10-300 parts by weight, more preferably 20-250 parts by weight per 100 parts by weight of the resin.

The electro-conductive titanium oxide of the present invention can be used in the form of powder, and can also be in the form of a dispersion prepared by previously dispersing in a solvent. When an electro-conductive coating composition is prepared using the dispersion, high dispersibility is readily obtained, which is preferred. As the solvent of the dispersion, a solvent which is the same as contained in the desired composition or higher in compatibility is selected. A dispersant may be added to the dispersion, and the dispersant is optionally selected depending on the solvent. For example, when the solvent is an aqueous solvent, there may be used phosphoric acid compounds such as sodium phosphate, sodium pyrophosphate, sodium orthophosphate, sodium metaphosphate and sodium tripolyphosphate, water-soluble silicon compounds such as sodium silicate, and amines such as aminomethylpropanol and aminomethylpropanediol, and when the solvent is a non-aqueous solvent, there may be used anionic dispersants such as carboxylic acid salts, sulfuric acid esters, sulfonic acid salts and phosphoric acid esters, cationic dispersants such as carboxylic acid amine salts, quaternary ammonium salts of amine carboxylate, aromatic quaternary ammonium salts and heterocyclic quaternary ammonium salts, amphoteric dispersants such as betaine type, amino acid type, alkylamine oxide and nitrogen-containing heterocyclic type dispersants, and nonionic dispersants such as ether type, ether ester type, ester type and nitrogen-containing type dispersants. For the electro-conductive titanium oxide used in non-aqueous solvent dispersion, the surface may be coated with the above organosilicon compound, organometallic compounds or hydrolyzates thereof.

EXAMPLES

The present invention will be illustrated by the following examples, which should not be construed as limiting the invention.

1. Process for Producing Columnar Titanium Dioxide Particles

Example 1

(The First Step)

40 parts by weight (in terms of $TiO_2$) of a dry ground product of titanium dioxide sol, 40 parts by weight of sodium chloride as an alkali metal compound, and 10 parts by weight of sodium secondary phosphate ($Na_2HPO_4$) as an oxyphosphorus compound were uniformly mixed, and the mixture was put in a crucible and fired at 825° C. for 3 hours in an electric furnace. Then, the fired product was introduced into deionized water and boiled for 1 hour, and then filtered and washed to remove soluble salts, followed by drying and grinding to obtain acicular titanium dioxide nucleus crystals having a weight-average minor-axis length of 0.25 µm and a weight-average major-axis length of 3.4 µm.

Subsequently, 38 parts by weight (in terms of $TiO_2$) of a dry ground product of titanium dioxide sol, 40 parts by weight of sodium chloride as an alkali metal compound, 10 parts by weight of sodium secondary phosphate ($Na_2HPO_4$) as an oxyphosphorus compound, and 2 parts by weight of the acicular titanium dioxide nucleus crystals obtained above were uniformly mixed, and the mixture was put in a crucible and fired at 825° C. for 3 hours in an electric furnace to grow the acicular titanium dioxide nucleus crystals. Then, the grown acicular titanium dioxide nucleus crystals were introduced into deionized water and boiled for 1 hour, and then filtered and washed to remove soluble salts, followed by drying and grinding to obtain grown acicular titanium dioxide nucleus crystals (sample a). An electron photomicrograph thereof is shown in FIG. 1.

The titanium dioxide sol used here was prepared by neutralizing an aqueous titanium tetrachloride solution having a concentration of 200 g/liter as $TiO_2$ with an aqueous sodium hydroxide solution while keeping the temperature at 30° C. to precipitate a colloidal amorphous titanium hydroxide, and this colloidal titanium hydroxide was aged at 70° C. for 5 hours to form a rutile type fine titania sol.

(The Second Step)

85 parts by weight (in terms of $TiO_2$) of the above dry ground product of titanium dioxide sol, 50 parts by weight of sodium chloride as an alkali metal compound, 10 parts by weight of sodium pyrophosphate as an oxyphosphorus compound were uniformly mixed with 15 parts by weight of the grown acicular titanium dioxide nucleus crystals (sample a), and the mixture was put in a crucible and fired at 825° C. for 3 hours in an electric furnace to further grow the acicular titanium dioxide nucleus crystals. Then, the fired product was introduced into deionized water to prepare a suspension, to which an aqueous sodium hydroxide solution (200 g/liter) was added to adjust the pH of the suspension to 13.0. Thereafter, the suspension was heated to 90° C. and stirred for 2 hours to perform alkali treatment, and then an aqueous hydrochloric acid solution (100 g/liter) was added to adjust the pH of the suspension to 7.0, followed by filtering and washing. The resulting cake was again introduced into water to prepare an aqueous suspension, then, an aqueous hydrochloric acid solution (100 g/liter) was added to adjust the pH to 1.0, and the suspension was heated to 90° C. and stirred for 2 hours, followed by filtering, washing, drying and grinding to obtain columnar titanium dioxide particles (sample A).

The sample A contained sodium (univalent) in an amount of 0.0002 in atomic ratio to Ti of titanium dioxide as an impurity having a valence of 4 or less, and no other metal elements having a valence of 4 or less were detected, and the value (A) obtained by the formula (1) was 0.0006. Furthermore, as elements (excluding oxygen) other than the metal elements having a valence of 4 or less, there was contained 0.06% by weight of phosphorus (valence: 5, non-metallic element) as $P_2O_5$, and $TiO_2$ purity was 99.6% by weight. An electron photomicrograph of the sample A is shown in FIG. 2.

Evaluation 1 (Measurement of Powder Characteristics)

Minor-axis length and major-axis length, and particle size distribution of sample A of Example 1 and the acicular titanium dioxide nucleus crystals obtained at the first step (sample a) were measured from electron photomicrograph. Moreover, specific surface area was measured by BET method. The results are shown in Table 1. It can be seen that columnar titanium dioxide particles having a large major-axis length, less in particles having small major-axis length and having a satisfactory particle size distribution can be obtained by the present invention.

TABLE 1

|  | Sample A | Sample a |
| --- | --- | --- |
| Weight-average minor-axis length (µm) | 0.51 | 0.42 |
| Weight-average major-axis length (µm) | 9.7 | 5.0 |

TABLE 1-continued

|  | Sample A | Sample a |
| --- | --- | --- |
| Content of particles having major-axis length of smaller than 5 μm (% by weight) | 8.9 | 49.7 |
| Content of particles having major-axis length of 10 μm or larger (% by weight) | 46.6 | 2.9 |
| Specific surface area (m²/g) | 2.4 | 3.9 |

2. Process for Producing Columnar Electro-Conductive Titanium Oxide

Example 2

The columnar titanium dioxide obtained in Example 1 was introduced into deionized water to prepare a suspension of 100 g/liter in concentration. One liter of this suspension was heated to 70° C., and thereto were added in parallel 23.5 g of a 50% aqueous tin chloride solution, a solution prepared by dissolving 1.3 g of antimony chloride in 59 g of a 35% aqueous hydrochloric acid solution, and a 17% aqueous sodium hydroxide solution over 60 minutes with keeping the pH of the suspension at 2-3 to form a coating layer comprising hydrates of tin oxide and antimony oxide on the surface of the columnar titanium dioxide. Thereafter, the suspension was filtered and washed until the specific resistance of the filtrate reached 50 μS/cm, then dried for twenty-four hours at 120° C., and then fired at 600° C. for 1 hour in an electric furnace to obtain columnar electro-conductive titanium oxide (sample B) which was coated with an electro-conductive layer of tin oxide containing antimony dissolved in solid state and which contained 6.3% by weight of $SnO_2$ and 0.8% by weight of $Sb_2O_5$ (amount of $SnO_2$: 0.028 g per 1 m² of surface area of the columnar particles, Sb/Sn=0.12).

This sample B had a weight-average major-axis length of about 9 μm and a weight-average minor-axis length of about 0.5 μm. Furthermore, content of particles having a major-axis length of 10 μm or larger and content of particles having a major-axis length of smaller than 5 μm were nearly the same as those of columnar titanium dioxide of sample A in Example 1.

Example 3

The columnar titanium dioxide obtained in Example 1 was introduced into deionized water to prepare a suspension having a concentration of 100 g/liter. One liter of this suspension was heated to 70° C., and thereto were added in parallel 36.9 g of a 50% aqueous tin chloride solution, a solution prepared by dissolving 4.2 g of antimony chloride in 59 g of a 35% aqueous hydrochloric acid solution, and a 17% aqueous sodium hydroxide solution over 60 minutes with keeping the pH of the suspension at 2-3 to form a coating layer comprising hydrates of tin oxide and antimony oxide on the surface of the columnar titanium dioxide. Then the suspension was filtered and washed until the specific resistance of the filtrate reached 50 μS/cm, thereafter dried for twenty-four hours at 120° C., and then fired at 600° C. for 1 hour in an electric furnace to obtain columnar electro-conductive titanium oxide (sample C) which was coated with an electro-conductive layer of tin oxide containing antimony dissolved therein in solid state and which contained 10.1% by weight of $SnO_2$ and 2.7% by weight of $Sb_2O_5$ (amount of $SnO_2$: 0.052 g per 1 m² of surface area of the columnar particles, Sb/Sn=0.25).

This sample C had a weight-average major-axis length of about 9 μm and a weight-average minor-axis length of about 0.5 μm. Furthermore, content of particles having a major-axis length of 10 μm or larger and content of particles having a major-axis length of smaller than 5 μm were nearly the same as those of the sample A in Example 1.

Example 4

One liter of a suspension obtained in the same manner as in Example 2 was heated to 70° C., and thereto were added in parallel 53.7 g of a 50% aqueous tin chloride solution, a solution prepared by dissolving 2.2 g of 75% orthophosphoric acid in 59 g of a 35% aqueous hydrochloric acid solution, and a 17% aqueous sodium hydroxide solution over 60 minutes with keeping the pH at 9-10 to form a coating layer comprising a hydrate of tin oxide and phosphorus on the surface of the columnar titanium dioxide. Then, the suspension was filtered and washed until the specific resistance of the filtrate reached 50 μS/cm, thereafter dried at 120° C. for twenty-four hours, then heated from room temperature to 900° C. over 1 hour in nitrogen in an electric furnace, kept at 900° C. for 1 hour, and then cooled to room temperature over 3 hours to obtain columnar electro-conductive titanium oxide (sample D) which was coated with an electro-conductive layer of tin oxide containing phosphorus dissolved therein in solid state and which contained 13.4% by weight of $SnO_2$ and 1.0% by weight of $P_2O_5$ (amount of $SnO_2$: 0.065 g per 1 m² of surface area of the columnar particles, P/Sn=0.16).

This sample D had a weight-average major-axis length of about 9 μm and a weight-average minor-axis length of about 0.5 μm. Furthermore, content of particles having a major-axis length of 10 μm or larger and content of particles having a major-axis length of smaller than 5 μm were nearly the same as those of the sample A in Example 1.

Comparative Example 1

The acicular titanium dioxide obtained in Example 1 (sample a) was introduced into deionized water to prepare a suspension of 100 g/liter in concentration. One liter of this suspension was heated to 70° C., and then thereto were added in parallel 38.0 g of a 50% aqueous tin chloride solution, a solution prepared by dissolving 2.0 g of antimony chloride in 59 g of a 35% aqueous hydrochloric acid solution, and a 17% aqueous sodium hydroxide solution over 60 minutes with keeping the pH of the suspension at 2-3 to form a coating layer comprising hydrates of tin oxide and antimony oxide on the surface of the acicular titanium dioxide. Thereafter, the suspension was filtered and washed until the specific resistance of the filtrate reached 50 μS/cm, then dried for twenty-four hours at 120° C., and then fired at 600° C. for 1 hour in an electric furnace to obtain acicular electro-conductive titanium oxide (sample E) which was coated with an electro-conductive layer of tin oxide containing antimony dissolved therein in solid state and which contained 9.8% by weight of $SnO_2$ and 1.3% by weight of $Sb_2O_5$ (amount of $SnO_2$: 0.028 g per 1 m² of surface area of the acicular particles, Sb/Sn=0.12).

This sample E had a weight-average major-axis length of about 5 μm and a weight-average minor-axis length of about 0.4 μm. Furthermore, content of particles having a major-axis length of 10 μm or larger and content of particles having a major-axis length of smaller than 5 μm were nearly the same as those of sample a in Example 1.

Evaluation 2 (Measurement of Surface Resistivity of Coating Film)

Each 6 g of the columnar electro-conductive titanium oxides obtained in Examples 2, 3 and 4 (sample B, C and D), and acicular electro-conductive titanium oxide obtained in Comparative Example 1 (sample E) was mixed with 18.75 g of chlorinated polypropylene resin (SUPERCHLON 822, solid content: 20% by weight; manufactured by Nippon Paper Chemicals Co., Ltd.), 1.35 g of a thixotropy imparting agent (ASAT-75F manufacture by Itoh Oil Chemicals Co., Ltd.), 7.5 g of xylene and 20 g of glass beads, and then the mixture was shaken for 30 minutes by a paint shaker (#5110 manufactured by Red Devil Co., Ltd.) to prepare the respective mill bases. Separately, 186.5 g of chlorinated polypropylene resin (SUPERCHLON 822, solid content: 20% by weight; manufactured by Nippon Paper Chemicals Co., Ltd.), 19.5 g of chlorinated paraffin (A-40A manufactured by Tosoh Corporation) and 1.1 g of an epoxy resin (Epikote 828 manufactured by Japan Epoxy Resin Co., Ltd.) were mixed to prepare a resin solution.

Then, a coating composition was prepared by carrying out stirring and mixing at the formulations of Table 2. This coating composition was coated on a PET film (Toray RUMIRROR 75 μm thickness-T60) at a dry thickness of 22.5 μm, and baked at 80° C.×5 minutes to obtain a coating film for test. The surface resistivity of the coating film for test was measured by a digital ohm meter (R-506 manufactured by Kawaguchi Electric Works Co., Ltd. or TR-8601 manufactured by Advantest Corporation). The results are shown in Table 3. It can be seen that the columnar electro-conductive titanium oxide obtained in the present invention showed excellent conductivity in the coating film due to its shape effect.

TABLE 2

| PWC (%) | 30 | 35 |
|---|---|---|
| Mill base | 4.48 g | 4.48 g |
| Resin solution | 4.26 g | 2.89 g |
| Xylene | 2.68 g | 1.89 g |

PWC: Pigment weight concentration

TABLE 3

| | Surface resistivity (Ω/□) | |
|---|---|---|
| PWC (%) | 30 | 35 |
| Sample B | $3.4 \times 10^9$ | $3.4 \times 10^7$ |
| Sample C | $1.5 \times 10^9$ | $1.0 \times 10^7$ |
| Sample D | $2.4 \times 10^9$ | $1.3 \times 10^8$ |
| Sample E | $2.3 \times 10^{10}$ | $1.9 \times 10^8$ |

PWC: Pigment weight concentration

A titanium oxynitride having the composition represented by TiNyOz and having columnar shape was produced by heating and firing the columnar titanium dioxide obtained in Example 1 at 650° C. for 5 hours in ammonia gas. This sample had a weight-average major-axis length of about 9 μm and a weight-average minor-axis length of about 0.5 μm. Furthermore, content of particles having a major-axis length of 10 μm or larger and content of particles having a major-axis length of smaller than 5 μm were nearly the same as those of sample A in Example 1.

INDUSTRIAL APPLICABILITY

The titanium oxide of the present invention having columnar shape is useful as bases of electro-conductive materials, reinforcing materials, catalysts, catalyst carriers, pigments, etc., and particularly useful as bases of electro-conductive materials. Furthermore, the electro-conductive titanium oxide of the present invention is useful as electro-conductive materials to be incorporated in plastic resin compositions, e.g., electro-conductive coating compositions such as anti-static coating composition, electro-conductive primers for electrostatic coating; anti-static sheets for automobile parts and electronic parts; planar heater with self control temperature.

BRIEF DESCRIPTION OF THE DRAWINGS

FIG. 1 An electron photomicrograph of sample a.

Figure 1:
Figure 2:
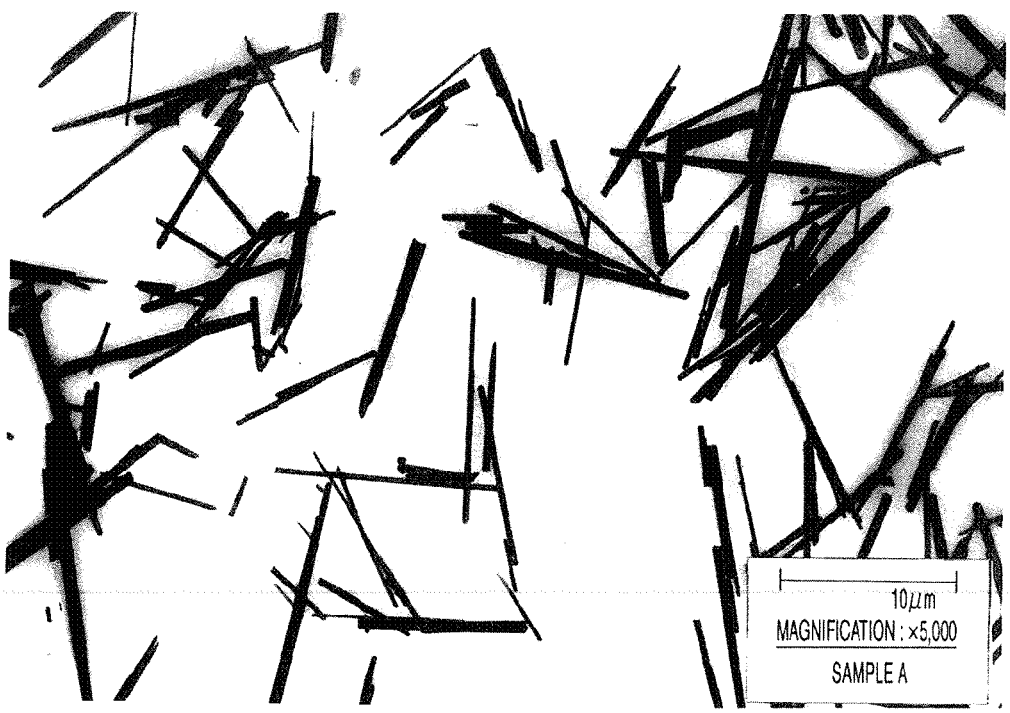
FIG. 2 An electron photomicrograph of sample A.
Figure 3:
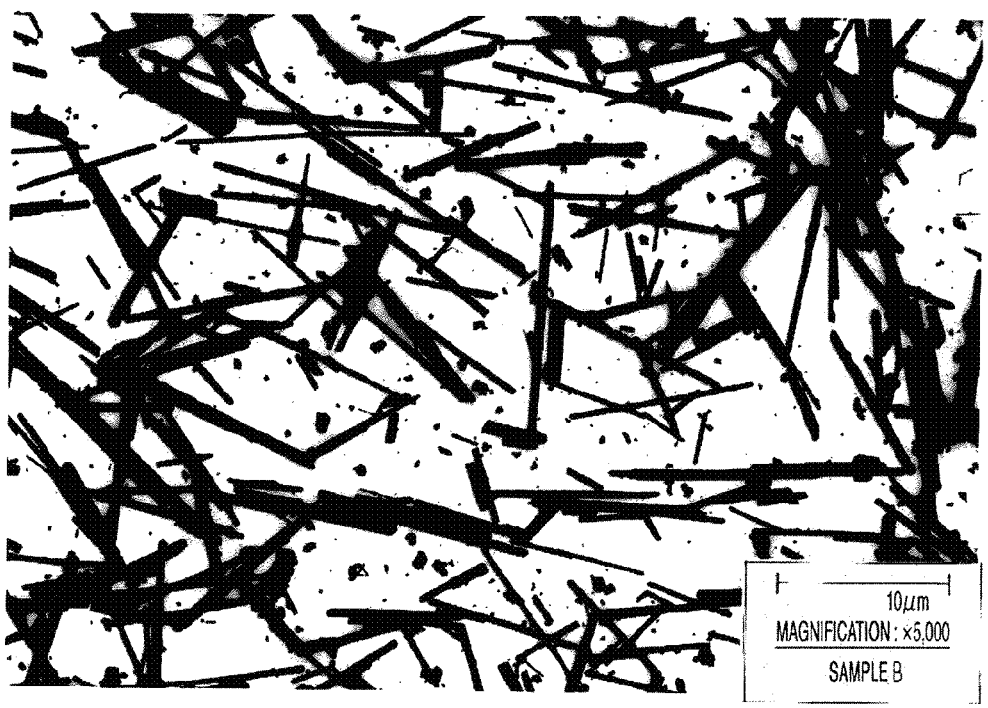
FIG. 3 An electron photomicrograph of sample B.
Figure 4:
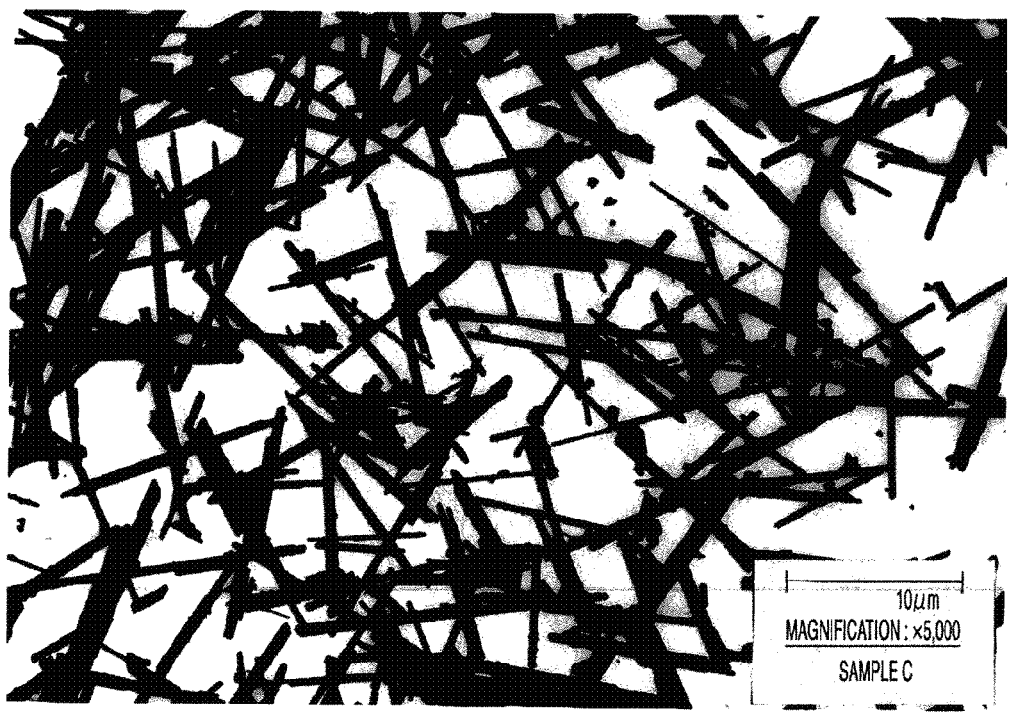
FIG. 4 An electron photomicrograph of sample C.
Figure 5:
FIG. 5 An electron photomicrograph of sample E.

The invention claimed is:

1. A process for producing titanium dioxide which comprises producing titanium dioxide in the shape of columnar particles through the first step of heating and firing a titanium compound, an alkali metal compound and an oxyphosphorus compound in the presence of titanium dioxide nucleus crystals having an aspect ratio of 2 or higher, thereby growing titanium dioxide nucleus crystals, and the second step of further adding a titanium compound, an alkali metal compound and an oxyphosphorus compound and heating and firing them in the presence of the grown titanium dioxide nucleus crystals.

2. A process for producing titanium dioxide according to claim 1, wherein at the first step, the titanium dioxide nucleus crystals are grown so that the ratio of weight-average major-axis length of the titanium dioxide nucleus crystals after growing to that of the titanium dioxide nucleus crystals reaches 3-7, and at the next second step, the titanium dioxide nucleus crystals are grown so that the ratio of weight-average major-axis length of the produced titanium dioxide to that of the titanium dioxide nucleus crystals reaches 2-5.

3. A process for producing titanium dioxide according to claim 1, wherein the weight-average major-axis length of the titanium dioxide nucleus crystals used at the first step is 1-4 μm, and that of the titanium dioxide nucleus crystals used at the second step is 3-7 μm.

4. A process for producing titanium dioxide according to claim 1, wherein the titanium dioxide nucleus crystals used at the first step are produced by heating and firing a titanium compound, an alkali metal compound and an oxyphosphorus compound.

5. A process for producing titanium dioxide according to claim 1, wherein the step of growing titanium dioxide nucleus crystals by heating and firing a titanium compound, an alkali metal compound and an oxyphosphorus compound in the presence of titanium dioxide nucleus crystals having an aspect ratio of 2 or higher is repeated twice or more to grow titanium dioxide nucleus crystals.

6. A process for producing titanium dioxide according to claim 5, wherein the titanium dioxide nucleus crystals are grown so that the ratio of weight-average major-axis length of the titanium dioxide nucleus crystals after growing to that of the titanium dioxide nucleus crystals used at each growing step reaches 1.2-7.

* * * * *